United States Patent
Fan et al.

(10) Patent No.: US 11,601,426 B2
(45) Date of Patent: Mar. 7, 2023

(54) DEVICE AUTHENTICATION METHOD, SERVICE ACCESS CONTROL METHOD, DEVICE, AND NON-TRANSITORY COMPUTER-READABLE RECORDING MEDIUM

(71) Applicants: Xiaojing Fan, Beijing (CN); Wei Wang, Beijing (CN); Haihua Yu, Beijing (CN); Ke Liao, Beijing (CN); Liyan Liu, Beijing (CN)

(72) Inventors: Xiaojing Fan, Beijing (CN); Wei Wang, Beijing (CN); Haihua Yu, Beijing (CN); Ke Liao, Beijing (CN); Liyan Liu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 16/850,088

(22) Filed: Apr. 16, 2020

(65) Prior Publication Data
US 2020/0336481 A1 Oct. 22, 2020

(30) Foreign Application Priority Data
Apr. 19, 2019 (CN) .......................... 201910318449.5

(51) Int. Cl.
| | |
|---|---|
| *H04L 29/06* | (2006.01) |
| *H04L 9/40* | (2022.01) |
| *H04L 9/06* | (2006.01) |
| *H04L 9/08* | (2006.01) |
| *H04L 9/32* | (2006.01) |

(52) U.S. Cl.
CPC ........ *H04L 63/0876* (2013.01); *H04L 9/0637* (2013.01); *H04L 9/0643* (2013.01);
(Continued)

(58) Field of Classification Search
CPC . H04L 63/0876; H04L 9/0637; H04L 9/0643; H04L 9/0869; H04L 9/0891; H04L 9/3247; H04L 9/3297; H04L 63/0442
See application file for complete search history.

(56) References Cited

U.S. PATENT DOCUMENTS

| | | | |
|---|---|---|---|
| 6,741,870 B1 * | 5/2004 | Holmstrom | H04M 1/72412 |
| | | | 455/552.1 |
| 10,102,526 B1 | 10/2018 | Madisetti et al. | |

(Continued)

FOREIGN PATENT DOCUMENTS

| | | | | |
|---|---|---|---|---|
| CN | 112840617 A | * | 5/2021 | ............. H04L 63/12 |
| EP | 3413507 | | 12/2018 | |

(Continued)

OTHER PUBLICATIONS

B. Zhou, H. Li and L. Xu, "An Authentication Scheme Using Identity-based Encryption & Blockchain," 2018 IEEE Symposium on Computers and Communications (ISCC), 2018, pp. 00556-00561, doi: 10.1109/ISCC.2018.8538446. (Year: 2018).*

(Continued)

*Primary Examiner* — Shawnchoy Rahman
(74) *Attorney, Agent, or Firm* — Harness, Dickey & Pierce, P.L.C.

(57) ABSTRACT

A device authentication method, a service access control method, a device, and a non-transitory computer-readable recording medium are provided. In the device authentication method, an authentication request device issues an authentication request transaction in a distributed ledger, and an authentication response device reads the authentication request transaction in the distributed ledger and performs authentication. Thus, no third-party authentication center or coordinate device is required to participate in an authentication handshake process, thereby reducing deployment overhead of an authentication system and improving efficiency of authentication and access service control.

14 Claims, 10 Drawing Sheets

(52) U.S. Cl.
CPC .......... *H04L 9/0869* (2013.01); *H04L 9/0891* (2013.01); *H04L 9/3247* (2013.01); *H04L 9/3297* (2013.01); *H04L 63/0442* (2013.01); *H04L 63/101* (2013.01)

(56) References Cited

U.S. PATENT DOCUMENTS

| | | | |
|---|---|---|---|
| 2004/0015723 A1* | 1/2004 | Pham | H04L 63/10 709/217 |
| 2013/0019291 A1 | 1/2013 | Zou | |
| 2017/0316390 A1 | 11/2017 | Smith et al. | |
| 2018/0227293 A1* | 8/2018 | Uhr | H04L 9/0637 |

FOREIGN PATENT DOCUMENTS

| | | |
|---|---|---|
| JP | 6939313 B2 * | 9/2021 |
| WO | WO-2017/127564 A1 | 7/2017 |

OTHER PUBLICATIONS

L. Xiong, F. Li, S. Zeng, T. Peng and Z. Liu, "A Blockchain-Based Privacy-Awareness Authentication Scheme With Efficient Revocation for Multi-Server Architectures," in IEEE Access, vol. 7, pp. 125840-125853, 2019, (Year: 2019).*

Brogan, James, Immanuel Baskaran, and Navin Ramachandran. "Authenticating health activity data using distributed ledger technologies." Computational and structural biotechnology journal 16 (2018): 257-266. (Year: 2018).*

Karapanos, Nikolaos, and Srdjan Capkun. "On the Effective Prevention of {TLS}{Man-in-the-Middle} Attacks in Web Applications." 23rd USENIX security symposium (USENIX security 14). 2014. (Year: 2014).*

CA European Search Report dated Sep. 14, 2020.
CA Extended European Search Report dated Nov. 23, 2020.

* cited by examiner

DEVICE AUTHENTICATION METHOD, SERVICE ACCESS CONTROL METHOD, DEVICE, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 201910318449.5 filed on Apr. 19, 2019. The entire contents of which are incorporated herein by reference.

BACKGROUND OF THE INVENTION

1. Field of the Invention

The present invention relates to the field of device authentication, and specifically, a device authentication method, a service access control method, a device, and a non-transitory computer-readable recording medium.

2. Description of the Related Art

Device authentication is important for ensuring the security of information access and transactions. For example, in security services of industrial monitoring systems and security services of environmental monitoring systems, it is usually necessary to identify a valid user or device, thereby allowing the valid user or device to access a large amount of data of a monitoring terminal or a measuring terminal (such as a camera, an air or water quality measuring sensor). As another example, in an intelligent home or office system, it is necessary to identify a valid user or device, thereby controlling a terminal or accessing terminal data. In conventional authentication methods, a trusted third-party server or a dedicated secure channel is usually required.

Here, the trusted third-party server may be a certificate authority (CA) of a public key infrastructure (PKI) system, or a local authentication server that maintains all device authentication information in a local area network. The processing power of the third-party management server limits authentication efficiency. With the increasing popularity of smart mobile terminals and the rapid development of internet-of-things (IoT) technology, in a system including a large number of mobile terminals or IoT devices, if all devices are verified by interacting with the third-party server, the performance of the third-party server becomes a bottleneck. Therefore, in conventional applications, only one-way authentication is performed, that is, the service providing device is authenticated, and the service request device is not authenticated. In addition, the CA of the PKI requires a real-name authentication terminal, however real-name authentication is usually not necessary in an IoT system, which brings additional overhead.

A secure channel usually requires specific hardware support. For example, it is necessary to install a subscriber identification module (SIM) of a mobile cellular network, or to deploy an encryption system in advance. Therefore, the deployment cost of the authentication system increases, and the authentication system is not suitable for large-scale applications.

Thus, there is an urgent need for a low-cost device authentication method.

SUMMARY OF THE INVENTION

According to an aspect of the present invention, a device authentication method is provided. The device authentication method includes generating, by a first device, authentication request information; generating, by the first device, an authentication request transaction, and sending the authentication request transaction to a first device channel, the authentication request transaction including a public key of the first device and a first hash value of the authentication request information, and the first device channel being established on a distributed ledger; generating, by the first device, an authentication request message that includes the authentication request information and device channel information of the first device channel, producing a digital signature of the authentication request message using a private key of the first device, and sending the digital signature to a second device; and receiving, by the first device, an authentication response message returned by the second device, the authentication response message indicating whether authentication of the first device succeeds.

According to another aspect of the present invention, a device authentication method is provided. The device authentication method includes receiving, by a second device, an authentication request message sent by a first device, the authentication request message including authentication request information and device channel information of a first device channel, and the first device channel being established on a distributed ledger; reading, by the second device, an authentication request transaction on the first device channel based on the device channel information of the first device channel, the authentication request transaction including a public key of the first device and a first hash value of the authentication request information; verifying, by the second device, a digital signature of the authentication request message using the public key of the first device, and performing an authentication test on the first device based on at least the first hash value and obtaining an authentication result when verification of the digital signature succeeds; and recording, by the second device, an authentication status of the first device based on the authentication result, and sending an authentication response message to the first device, the authentication response message indicating whether authentication succeeds.

According to another aspect of the present invention, a service access control method is provided. The service access control method includes requesting, by a first device, a service list from a second device, and selecting a target service from the service list provided by the second device; generating, by the first device, service request information that includes the target service and a service access token; generating, by the first device, a service request transaction, and sending the service request transaction to a first device channel, the service request transaction including a second hash value of the service request information, and the first device channel being established on a distributed ledger; generating, by the first device, a service request message that includes the service request information, producing a digital signature of the service request message using a private key of the first device, and sending the digital signature to the second device; and receiving, by the first device, a service response message returned by the second device, the service response message indicating whether a service request is accepted.

According to another aspect of the present invention, a service access control method is provided. The service access control method includes receiving, by a second device, a service list request message sent by a first device, and providing a service list to the first device; receiving, by the second device, a service request message sent by the first device, the service request message including service request information, and the service request information including a target service and a service access token; verifying, by the second device, a digital signature of the service request message using a public key of the first device when an authentication status of the first device is successful authentication, and reading a service request transaction on a first device channel based on pre-obtained device channel information of the first device channel when verification of the digital signature succeeds, the service request transaction including at least a second hash value of the service request information, and the first device channel being established on a distributed ledger; performing, by the second device, a service request test based on at least the service request information and the second hash value, and obtaining a service request test result indicating whether a service request is accepted; and sending, by the second device, a service response message to the first device based on the service request test result, the service response message indicating whether the service request is accepted.

According to another aspect of the present invention, a first device is provided. The first device includes a first information generating unit configured to generate authentication request information; a first transaction generating unit configured to generate an authentication request transaction, and send the authentication request transaction to a first device channel, the authentication request transaction including a public key of the first device and a first hash value of the authentication request information, and the first device channel being established on a distributed ledger; a first message sending unit configured to generate an authentication request message that includes the authentication request information and device channel information of the first device channel, produce a digital signature of the authentication request message using a private key of the first device, and send the digital signature to a second device; and a first message receiving unit configured to receive an authentication response message returned by the second device, the authentication response message indicating whether authentication of the first device succeeds.

According to another aspect of the present invention, a second device is provided. The second device includes a second message receiving unit configured to receive an authentication request message sent by a first device, the authentication request message including authentication request information and device channel information of a first device channel, and the first device channel being established on a distributed ledger; a first transaction obtaining unit configured to read an authentication request transaction on the first device channel based on the device channel information of the first device channel, the authentication request transaction including a public key of the first device and a first hash value of the authentication request information; an authentication processing unit configured to verify a digital signature of the authentication request message using the public key of the first device, and perform an authentication test on the first device based on at least the first hash value and obtaining an authentication result when verification of the digital signature succeeds; and a second message sending unit configured to record an authentication status of the first device based on the authentication result, and send an authentication response message to the first device, the authentication response message indicating whether authentication succeeds.

According to another aspect of the present invention, a first device is provided. The first device includes a service selecting unit configured to request a service list from a second device, and select a target service from the service list provided by the second device; a second information generating unit configured to generate service request information that includes the target service and a service access token; a second transaction generating unit configured to generate a service request transaction, and send the service request transaction to a first device channel, the service request transaction including a second hash value of the service request information, and the first device channel being established on a distributed ledger; a third message sending unit configured to generate a service request message that includes the service request information, produce a digital signature of the service request message using a private key of the first device, and send the digital signature to the second device; and a third message receiving unit configured to receive a service response message returned by the second device, the service response message indicating whether a service request is accepted.

According to another aspect of the present invention, a second device is provided. The second device includes a fourth message receiving unit configured to receive a service list request message sent by a first device, provide a service list to the first device, and receive a service request message sent by the first device, the service request message including service request information, and the service request information including a target service and a service access token; a second transaction obtaining unit configured to verify a digital signature of the service request message using a public key of the first device when an authentication status of the first device is successful authentication, and read a service request transaction on a first device channel based on pre-obtained device channel information of the first device channel when verification of the digital signature succeeds, the service request transaction including at least a second hash value of the service request information, and the first device channel being established on a distributed ledger; a service request testing unit configured to perform a service request test based on at least the service request information and the second hash value, and obtain a service request test result indicating whether a service request is accepted; and a fourth message sending unit configured to send a service response message to the first device based on the service request test result, the service response message indicating whether the service request is accepted.

According to another aspect of the present invention, an apparatus is provided. The apparatus includes a memory storing computer-executable instructions; and one or more processors. The one or more processors are configured to execute the computer-executable instructions such that the one or more processors carry out the above method.

According to another aspect of the present invention, a non-transitory computer-readable recording medium having computer-executable instructions for execution by one or more processors is provided. The computer-executable instructions, when executed, cause the one or more processors to carry out the above method.

BRIEF DESCRIPTION OF THE DRAWINGS

In order to explain embodiments of the present invention more clearly, drawings used in the description of the embodiments of the present invention will be briefly introduced below. Note that the drawings are merely exemplary drawings for explaining the embodiments of the present invention, and another drawing may be obtained based on the drawings by a person skilled in the art.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, description of conventional functions and structure is omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, the specific features, structures or characteristics may be combined in any suitable manner in one or more embodiments.

Note that steps of the methods may be performed sequentially, however the order in which the steps are performed is not limited to the recited order. Any step may be performed in parallel with or independently of any other step.

As described above, there is a problem of an efficiency bottleneck or high deployment cost in a case where a conventional authentication scheme is adopted in an IoT system that includes a large number of devices. In the anonymous distributed ledger-based authentication method according to the present invention, no third-party server is required to participate in authentication, and the hardware overhead of an additional secure channel is not required, thereby reducing cost of authentication. The authentication method according to the present invention is especially suitable for systems including a large number of devices, such as IoT systems.

An object of embodiments of the present invention is to provide a device authentication method, a service access control method, a device, and a non-transitory computer-readable recording medium capable of implementing device authentication and service access control at a lower cost.

Figure 1:
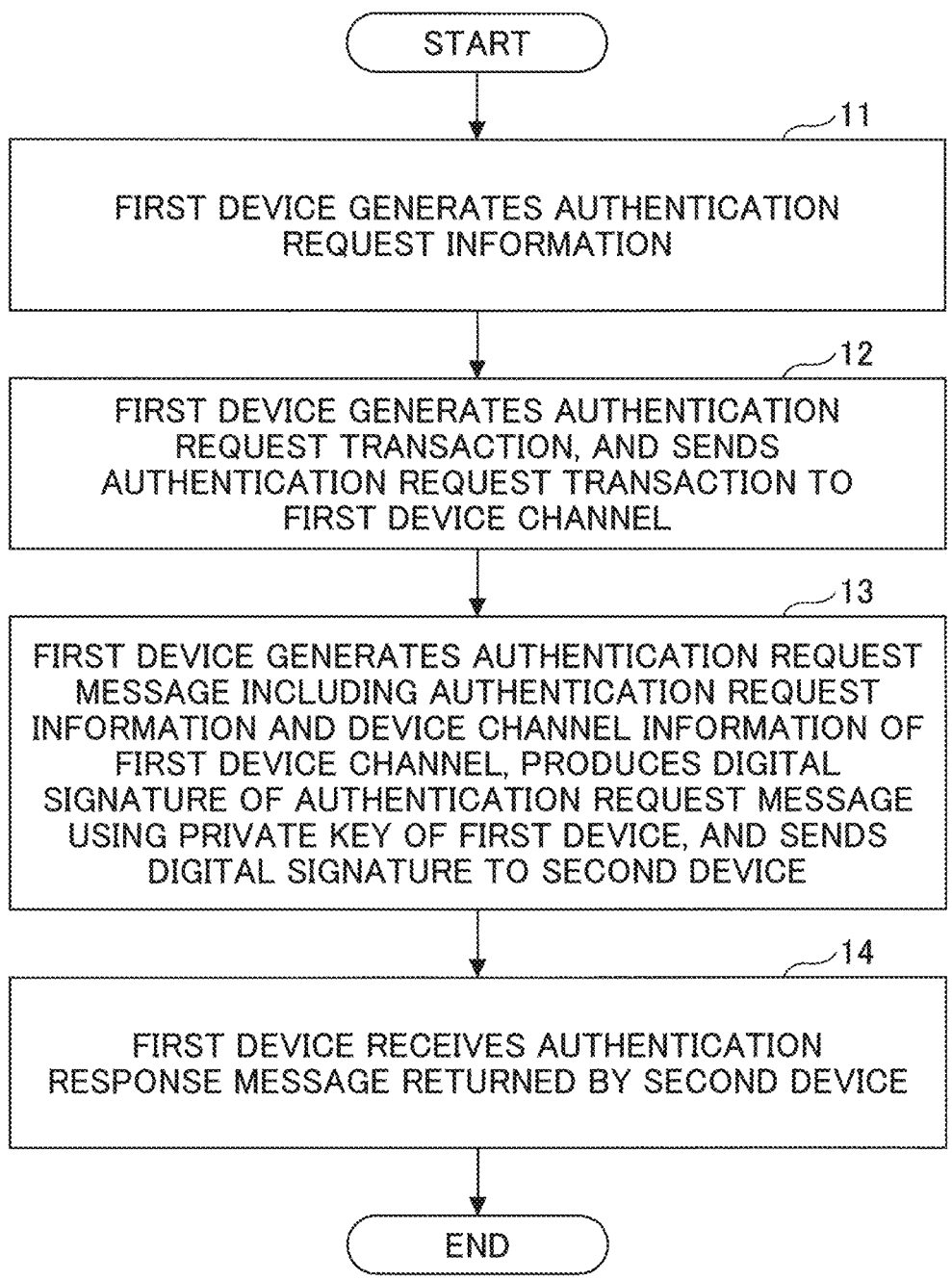
FIG. 1 is a schematic flowchart illustrating a device authentication method according to an embodiment of the present invention.

FIG. 1 is a schematic flowchart illustrating a device authentication method performed by a first device. Here, the first device is an authentication request device, the first device initiates an authentication request to a second device, and the second device authenticates the first device. Note that the scheme of the authentication request in the embodiment of the present invention may also be applied to the authentication of the second device by the first device, and the process is similar. Namely, referring to the authentication process shown in FIG. 1, the embodiment of the present invention may implement two-way authentication between the first device and the second device.

As shown in FIG. 1, the device authentication method according to the embodiment of the present invention includes the following steps.

In step 11, the first device generates authentication request information.

Here, the authentication request information may include challenge information, and the challenge information may specifically be a randomly generated random number. As an example, the authentication request information may further include a timestamp indicating when the authentication request information is generated, and device identification information of the first device. Specifically, the device identification information may be at least one of a device identifier (ID), a MAC address, an IP address, a device brand, and a device type of a device.

In step 12, the first device generates an authentication request transaction, and sends the authentication request transaction to a first device channel. The authentication request transaction includes a public key of the first device and a first hash value of the authentication request information. The first device channel is established on a distributed ledger.

Here, the authentication request transaction generated by the first device includes the public key in asymmetric keys of the first device, and the first hash value of the authentication request information. The first device sends the authentication request transaction to the first device channel of the first device.

As an example, the first device channel of the first device is established on the distributed ledger. The first device channel is used to record information of related transactions of the first device, the related transactions include the authentication request transaction, and may also include a key revocation transaction and a service request transaction described below.

As an example, when the distributed ledger is a blockchain, all transactions on the first device channel are generated by a blockchain account of the first device that established the channel, and the first device generates transactions based on a transaction generation method of the blockchain. A channel pointer is included in the transaction. The channel pointer of the first transaction of the first device channel is null, and the channel pointer of a transaction other than the first transaction is a hash value of a previous transaction on the first device channel.

As another example, when the distributed ledger is an IOTA (that is, a cryptocurrency for IoT), the first device channel may be a masked authenticated message (MAM) channel of an IOTA protocol, and the first device generates transactions based on a method specified by the MAM channel.

In addition, the first device may or may not be a node in the distributed ledger a node in the distributed ledger, that is, the first device may have an accounting module that writes transactions to the distributed ledger or may not have the accounting module. After generating transactions in the respective methods of the above device channels, if the first device includes the accounting module, the accounting module performs the operations for writing the ledger on the transaction, thereby sending the authentication request transaction to the first device channel. If the device does not include the accounting module, the first device may send related transactions to a public accounting node, and the public accounting node sends the transactions to the device channel. Specifically, if the distributed ledger is a blockchain, the public accounting node may be a blockchain miner node; and if the distributed ledger is an IOTA, the public accounting node may be an IOTA public node.

In step 13, the first device generates an authentication request message including the authentication request information and device channel information of the first device channel, produces a digital signature of the authentication request message using a private key of the first device, and sends the digital signature to a second device.

Here, the first device obtains the device channel information of the first device channel, after sending the authentication request transaction to the first device channel. As an example, when the distributed ledger is a blockchain, the device channel information includes a blockchain account address of the first device, and a hash value of a last transaction on the first device channel. As another example, when the distributed ledger is an IOTA, the device channel information includes an identifier (ID) of a MAM channel, and an address of a first transaction on the MAM channel. Then, the first device sends the authentication request message signed by the private key to the second device. Here, the authentication request message includes the authentication request information, and the device channel information of the first device channel, such that the second device obtains the authentication request transaction based on the device channel information of the first device channel, and authenticates the first device based on the obtained authentication request transaction and the authentication request information.

In addition, as another example, the first device may generate the authentication request message including the authentication request information in above step 11. Then, the first device may add the device channel information of the first device channel to the authentication request message, produce the digital signature of the authentication request message using the private key of the first device, and send the digital signature to the second device.

In step 14, the first device receives an authentication response message returned by the second device. The authentication response message indicates whether authentication of the first device succeeds.

Here, the second device returns the authentication response message indicating whether the authentication of the first device succeeds to the first device, after completing the authentication of the first device based on the authentication request message.

By the above steps, the first device implements an authentication handshake process with the second device, and implements an authentication process that does not depend on a third-party server or a secure channel. The implementation cost of the authentication process is low, and the authentication process can be applied to systems that include a large number of terminal devices (such as IoT systems).

In addition, in order to provide key security, as an example, the first device may periodically or aperiodically update the asymmetric keys (including the public key and the private key) of the first device, and generate a key revocation transaction after the update. The key revocation transaction includes the updated public key. Then, the first device sends the key revocation transaction to the first device channel, thereby updating the public key of the first device.

Figure 2:
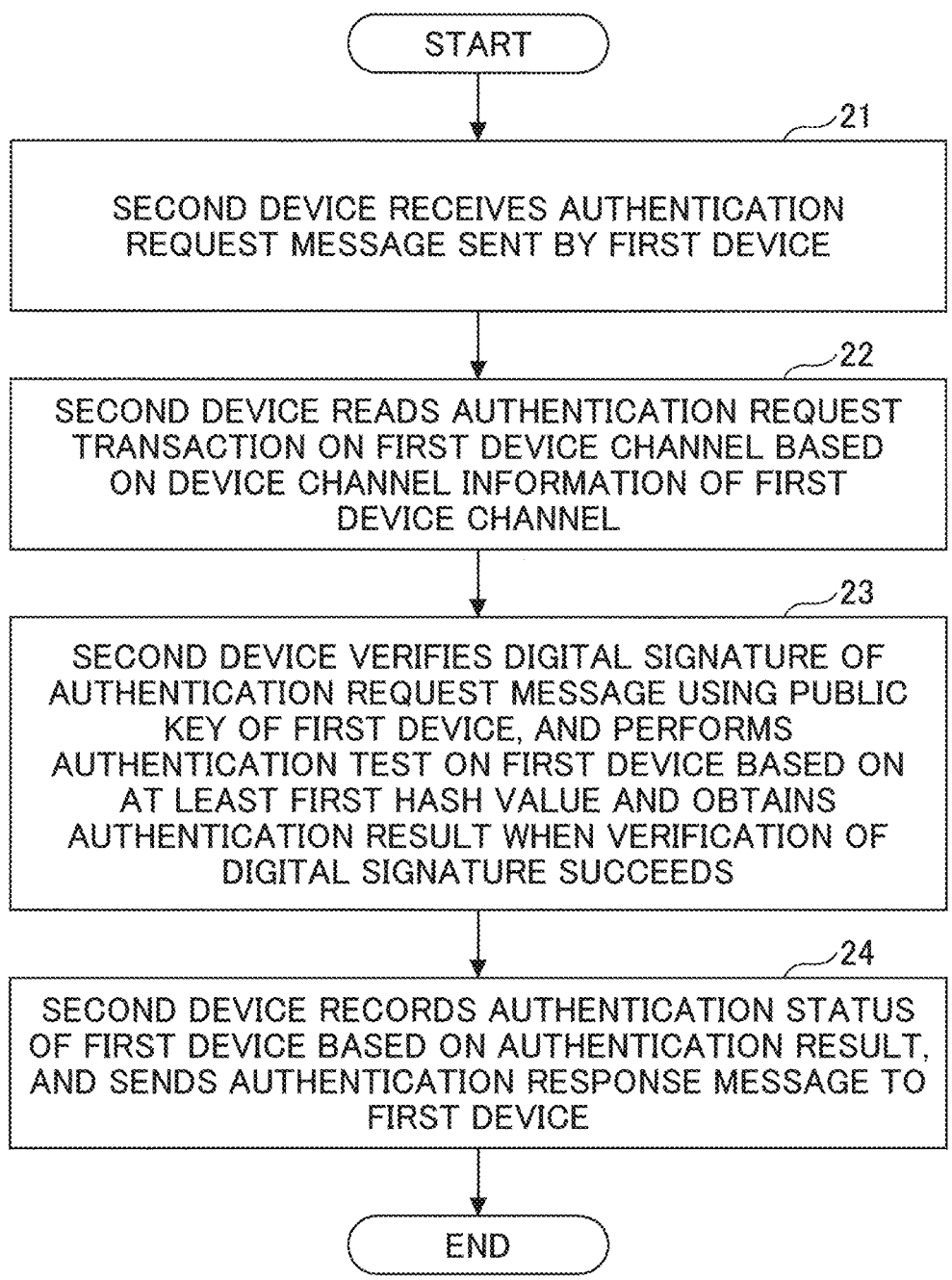
FIG. 2 is another schematic flowchart illustrating the device authentication method according to the embodiment of the present invention.

FIG. 2 is a schematic flowchart illustrating a device authentication method performed by a second device. As shown in FIG. 2, the device authentication method according to the embodiment of the present invention includes the following steps.

In step 21, the second device receives an authentication request message sent by a first device. The authentication request message includes authentication request information, and device channel information of a first device channel, and the first device channel is established on a distributed ledger.

Here, the authentication request information in the authentication request message may include a random number serving as challenge information, and may further include a timestamp indicating when the authentication request information is generated, and the device identification information of the first device. The device identification information specifically includes at least one of a device identifier (ID), a MAC address, an IP address, a device brand, and a device type.

In step 22, the second device reads an authentication request transaction on the first device channel based on the device channel information of the first device channel. The authentication request transaction includes a public key of the first device and a first hash value of the authentication request information.

Here, the second device may find and read the authentication request transaction on the device channel of the first device specified by the authentication request message, after receiving the authentication request message. The authentication request transaction includes the public key of the first device and the first hash value of the authentication request information.

In step 23, the second device verifies the digital signature of the authentication request message using the public key of the first device, and performs an authentication test on the first device based on at least the first hash value and obtains an authentication result when the verification of the digital signature succeeds.

Here, in step 23, the digital signature is verified using the public key, and the authentication test is further performed on the first device when the verification of the digital signature succeeds. Specifically, the authentication test may include the following authentication items, and the authentication result indicating that the authentication of the first device succeeds may be obtained, only when all authentication items succeeds.

(1) A third hash value of the authentication request information included in the authentication request message is calculated, and an authentication result indicating whether a hash value authentication succeeds is obtained, based on whether the third hash value is consistent with the first hash value.

In step 24, the second device records an authentication status of the first device based on the authentication result, and sends an authentication response message to the first device. The authentication response message indicates whether authentication succeeds.

Here, the second device may locally record the status indicating that the first device has been authenticated, when the authentication of the first device succeeds. Then, the second device may return the authentication response message indicating the authentication result to the first device.

As an example, after the first device is successfully authenticated, the second device may establish a first binding between the public key of the first device and the device channel information (such as a distributed ledger account) of the first device channel, thereby subsequently providing security services for the two devices.

As another example, after the first device is successfully authenticated, the second device may establish a second binding among the public key of the first device, the device channel information (such as a distributed ledger account) of the first device channel and the device identification information, thereby subsequently providing security services for the two devices.

By the above steps, the embodiment of the present invention implements the authentication process of the second device to the first device, the handshake process in the authentication process is simplified, and the cost of the authentication process can be reduced. No third-party authentication center or coordinate device is required to participate in the authentication process, thus deployment overhead of an authentication system can be reduced, and the problem that an authentication center serves as a bottleneck and limits system efficiency can be solved, thereby improving efficiency of authentication. Furthermore, in the embodiment of the present invention, the reliability of the authentication request device can be judged based on historical transaction records of the device channel on the distributed ledger. Generally, the greater the number of the historical transaction records of the device channel are, the higher the reliability of the device is. In addition, in the embodiment of the present invention, no third-party authentication center is required to perform real-name verification on the authentication request device, thereby reducing deployment overhead of an authentication system. Furthermore, in the method of the embodiment of the present invention, anonymous authentication is supported, thereby improving privacy of authentication.

As an example, the authentication request transaction may include a first timestamp indicating when the authentication request transaction is generated. The authentication request information may include a random number, and device identification information of the first device. In this case, the authentication items in step 23 may include at least one of the following items.

(2) A first interval between a timestamp of receiving the authentication request message and the first timestamp is calculated, and a test result indicating whether timeout authentication succeeds is obtained, based on whether the first interval is less than a predetermined first threshold.

(3) A test result indicating whether device validity authentication succeeds is obtained, based on whether the device identification information in the authentication request information matches a sending device of the authentication request message.

(4) Historical transaction records on the first device channel are queried, and a test result indicating whether device reliability authentication succeeds is obtained, based on whether the number of the historical transaction records is greater than a predetermined number.

When the authentication of all of the authentication items succeeds, the authentication result indicating that the authentication of the first device succeeds is obtained. When the authentication of any one of the authentication items fails, the authentication is ended, no other authentication items are performed, and the authentication result indicating that the authentication of the first device fails is obtained.

Note that during the authentication process of the above authentication items, the authentication may be performed in a predetermined order, and the embodiment of the present invention is not limited to a specific example.

The device authentication process of the embodiment of the present invention is introduced referring to the above steps. Similarly, the authentication of the first device to the second device may also be performed referring to the above process. In this case, only the roles of the first device and the second device in the above process need to be interchanged, and a detailed description thereof is omitted here.

Next, an interactive process in the above device authentication method will be described referring to FIG. 3 and FIG. 4. The authentication request device in FIG. 3 and FIG. 4 may be one of the first device and the second device, and the authentication response device may be the other device of the first device and the second device.

Figure 3:
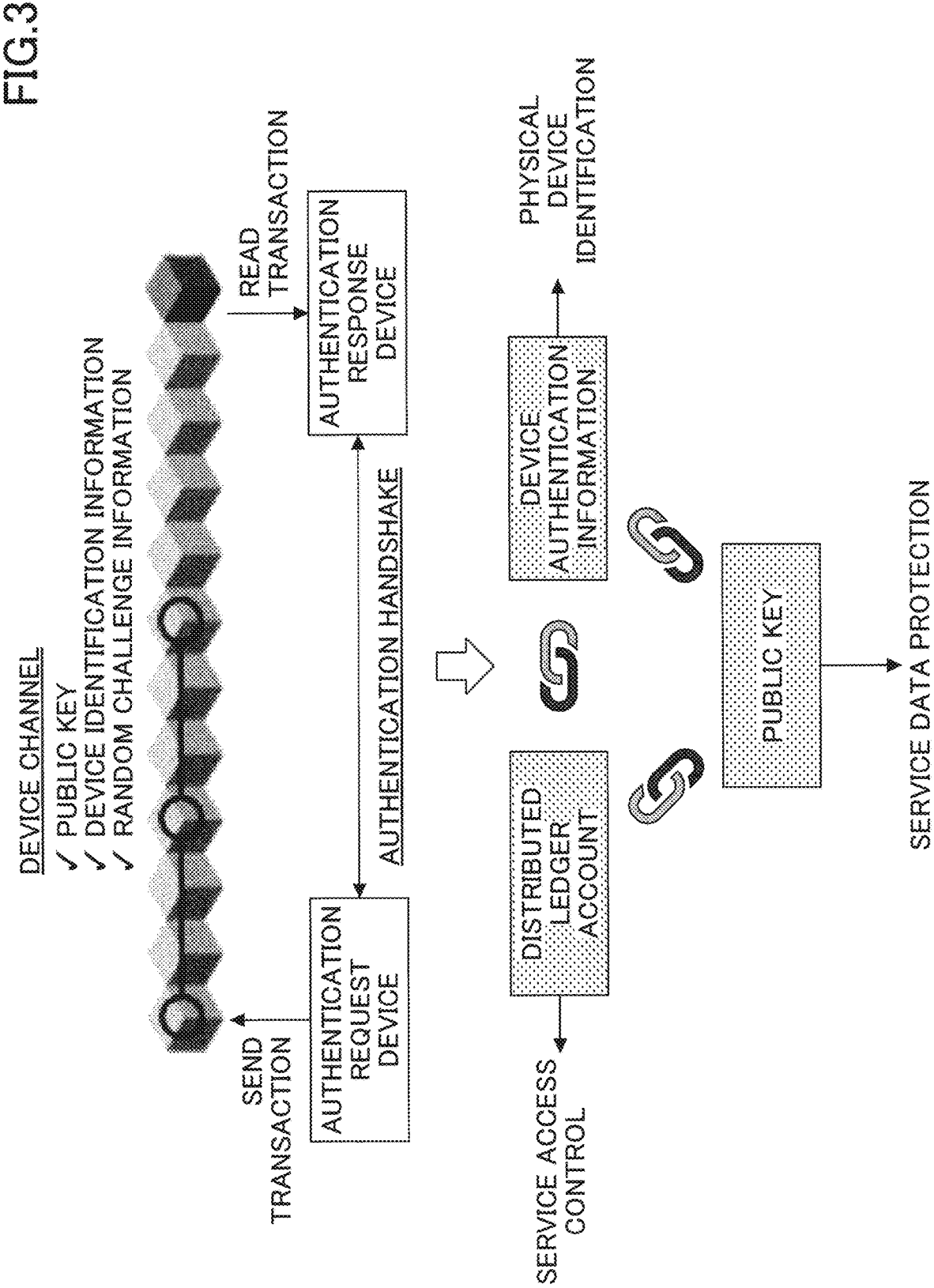
FIG. 3 is a schematic view illustrating an example of the device authentication method according to the embodiment of the present invention.

Specifically, FIG. 3 shows an example of the device authentication method according to the embodiment of the present invention. The authentication request device establishes a device channel on a distributed ledger, and writes an authentication request transaction to the device channel. The authentication request transaction specifically includes a public key, device identification information, and random challenge information. The device identification information may include at least one of a device identifier, a MAC address, an IP address, a device brand, and a device type. The random challenge information may include a random number, and may further include a timestamp. The authentication response device reads the device channel of the authentication request device, verifies the random challenge information and device identification information, and exchanges messages with the authentication request device to complete the authentication handshake process. After completing the authentication handshake process, a binding among a public key of the authentication request device, a distributed ledger account of the authentication request device, and the device identification information of the authentication request device is established, thereby providing subsequent security services for the two devices.

Figure 4:
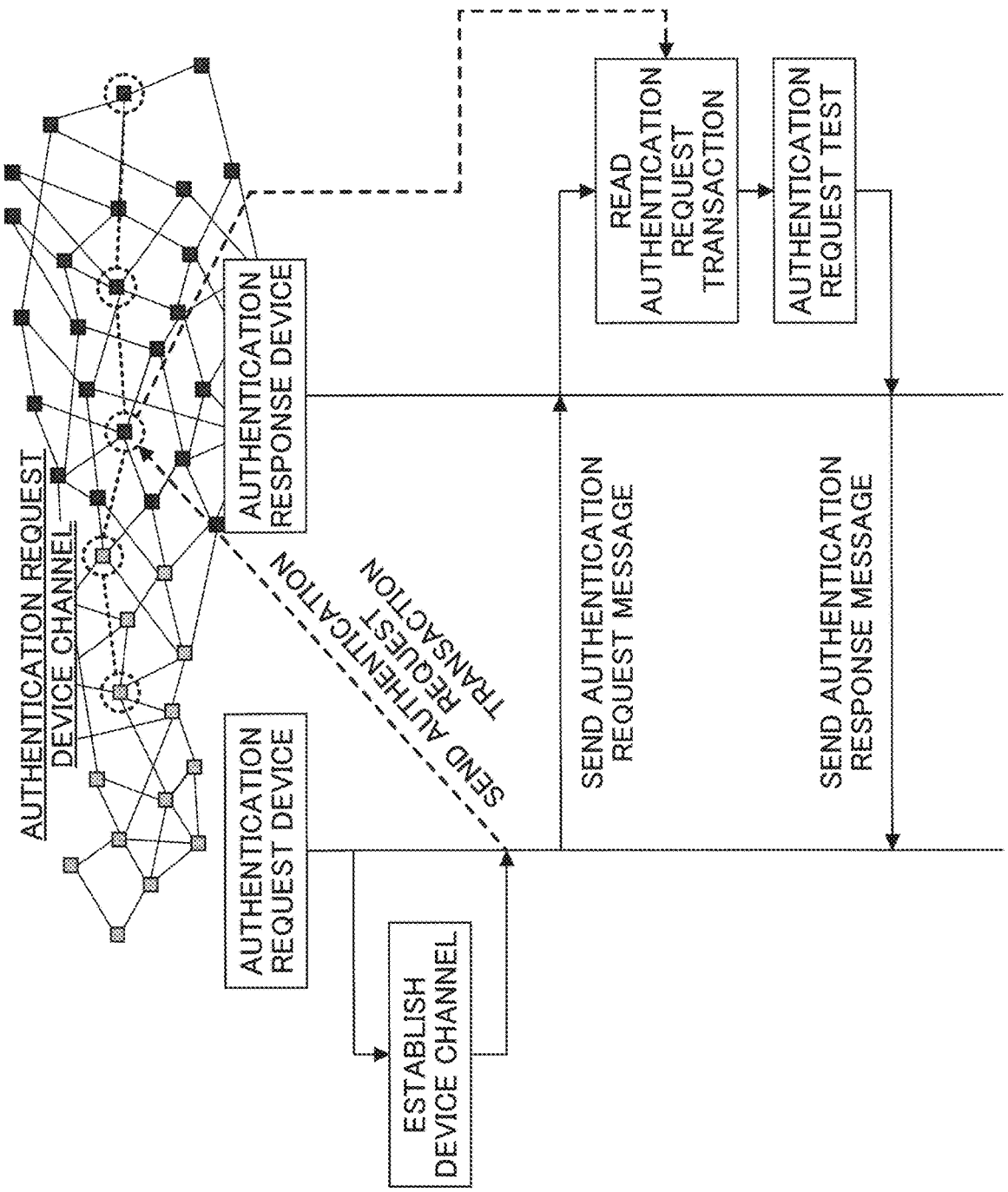
FIG. 4 is a schematic view illustrating an example of an interactive process of the device authentication method according to the embodiment of the present invention.

FIG. 4 shows an example of an interactive process of a distributed ledger-based device authentication method according to the embodiment of the present invention. In FIG. 4, the authentication request device establishes an authentication request device channel in the distributed ledger, sends an authentication request transaction to the authentication request device channel, and further sends an authentication request message to the authentication response device. The authentication response device receives the authentication request message, reads the authentication request device channel, and performs an authentication test. Then, the authentication response device send an authentication response message including an authentication result to the authentication request device.

In order to facilitate the understanding of the above authentication process of the embodiment of the present invention, a detailed example will be described below.

In this example, each device may establish the device channel of the device in the distributed ledger, and issue transactions on the device channel that can be read by other devices.

Specifically, the distributed ledger may be a blockchain. The device establishes a blockchain account address on the blockchain. All transactions on the device channel are sent from the blockchain account address of the device, and each transaction includes a hash value of the previous transaction on the device channel. The hash value included in the first transaction of the device channel is null. The device channel information includes the blockchain account address of the device, and the hash value of the last transaction on the current device channel.

The distributed ledger may also be an IOTA, and the device channel may be a Masked Authenticated Message (MAM) channel. The device randomly generates a root key, and generates a transaction address sequence using the root key according to the IOTA protocol rules. Each transaction includes the address of the current transaction, and the address of the next transaction on the MAM channel. The device channel information includes the address of the first transaction on the MAM channel.

Each device may generate an asymmetric key pair (including a public key and a private key) according to conventional technologies, and the private key is securely stored locally. In the authentication handshake process, the device sends an authentication request transaction including the public key to the device channel on the distributed ledger. In addition, the device may also periodically update the asymmetric key pair and send the transaction to the device channel to revoke the public key before the update.

In each authentication handshake process, the request device generates an authentication request message including authentication request information. The authentication request information includes a random number serving as challenge information, a timestamp, a device ID, a MAC address, an IP address, a device brand, a device type, and any other information for identifying the device. The request device generates an authentication request transaction, including a timestamp, a public key, and a hash value of the above authentication request information, and sends the authentication request transaction to a device channel on the distributed ledger. After sending the authentication request transaction, the device channel information is written into the authentication request message, a digital signature of the request authentication message is produced using the private request key, and the request authentication message is sent to the authentication response device.

The authentication response device receives the authentication request message, searches for the distributed ledger based on the device channel information included in the message, reads the authentication request transaction, obtains and stores the public key of the authentication request device included in the authentication request transaction, and authenticates the digital signature of the authentication request message using the public key. If the digital signature is valid, the authentication request message is further authenticated on authentication items. The authentication items may include but are not limited to the following items.

(A) A time interval between the local time and the timestamp included in the authentication request transaction is calculated. If the time interval is greater than a specified timeout threshold, the authentication result of the authentication item is a timeout, and the authentication of the first device fails. Otherwise, the authentication continues to the next authentication item.

(B) A hash value of the authentication request information included in the authentication request message is calculated, and the hash value is compared with a hash value of the authentication request information included in the authentication request transaction. If the two hash values are not consistent, the authentication result of the authentication item is a hash value error, and the authentication of the first device fails. Otherwise, the authentication continues to the next authentication item.

(C) The device information included in the authentication request information is compared with source device information of the authentication request message, which includes a device ID, a MAC address, an IP address, a brand, a device type or the like. If the information is inconsistent, the authentication result of the authentication item is an invalid device, and the authentication of the first device fails. Otherwise, the authentication continues to the next authentication item.

(D) Historical transactions on the device channel of the request device are queried. If the number of historical transactions is less than a specified threshold, the authentication result of the authentication item is an unreliable device, and the authentication of the first device fails.

If the above authentication of the authentication items are all successful, the authentication result is that the authentication of the first device is successful. The authentication response device records that the status of the authentication request device has been authenticated. Subsequently, the authentication response device may send an authentication response message, which includes the authentication result of the first device, to the authentication request device. The authentication request device receives an authentication response message, and determines that the authentication is successful, if the included authentication result of the first device is successful.

It can be seen from the above examples that the embodiments of the present invention can implement device authentication and service access control processes, without a trusted third-party server or a secure channel. In the authentication method of the embodiment of the present invention, the device completes authentication and challenge handshake using the distributed ledger, the authentication request device sends the authentication request message to the peer device, and sends the authentication request transaction including the authentication information and the challenge information to the device channel on the distributed ledger. The peer device queries and reads the authentication transaction on the distributed ledger, and compares the transaction information with the received authentication information and the challenge information to complete the verification. In the embodiment of the present invention, the device channel of the authentication request device is established on the distributed ledger, and authentication history transactions are recorded. The authentication history transactions can be used as a credit value to evaluate the reliability of the device, thereby implementing the device authentication without a trusted third party or a secure channel provided by additional hardware.

In contrast to conventional technologies, the device authentication method, the service access control method, the device, and the non-transitory computer-readable recording medium according to the embodiments of the present invention can reduce the deployment cost of an authentication system, and can solve the problem that an authentication center serves as a bottleneck and limits system efficiency. Furthermore, in the embodiments of the present invention, no third-party authentication center or coordinate device is required to perform real-name verification on an authentication request device, thereby reducing deployment overhead of an authentication system. In addition, in the embodiments of the present invention, anonymous authentication is supported, thereby improving privacy of authentication.

Next, a service access control method according to an embodiment of the present will be described.

The processes of applying the service access control method according to the embodiment of the present invention to the first device and the second device, respectively will be described referring to FIG. 5 and FIG. 6. Note that the processes in FIG. 5 and FIG. 6 may be executed after the second device completes a one-way authentication of the first device, or may be executed after the first device and the second device complete a mutual authentication of both parties. In addition, before the processes in FIG. 5 and FIG. 6, the authentication process in FIG. 1 and FIG. 2 may not be performed, but another authentication method in conventional technologies may be adopted, or no device authentication is performed between the first device and the second device. The embodiment is not limited to this.

Figure 5:
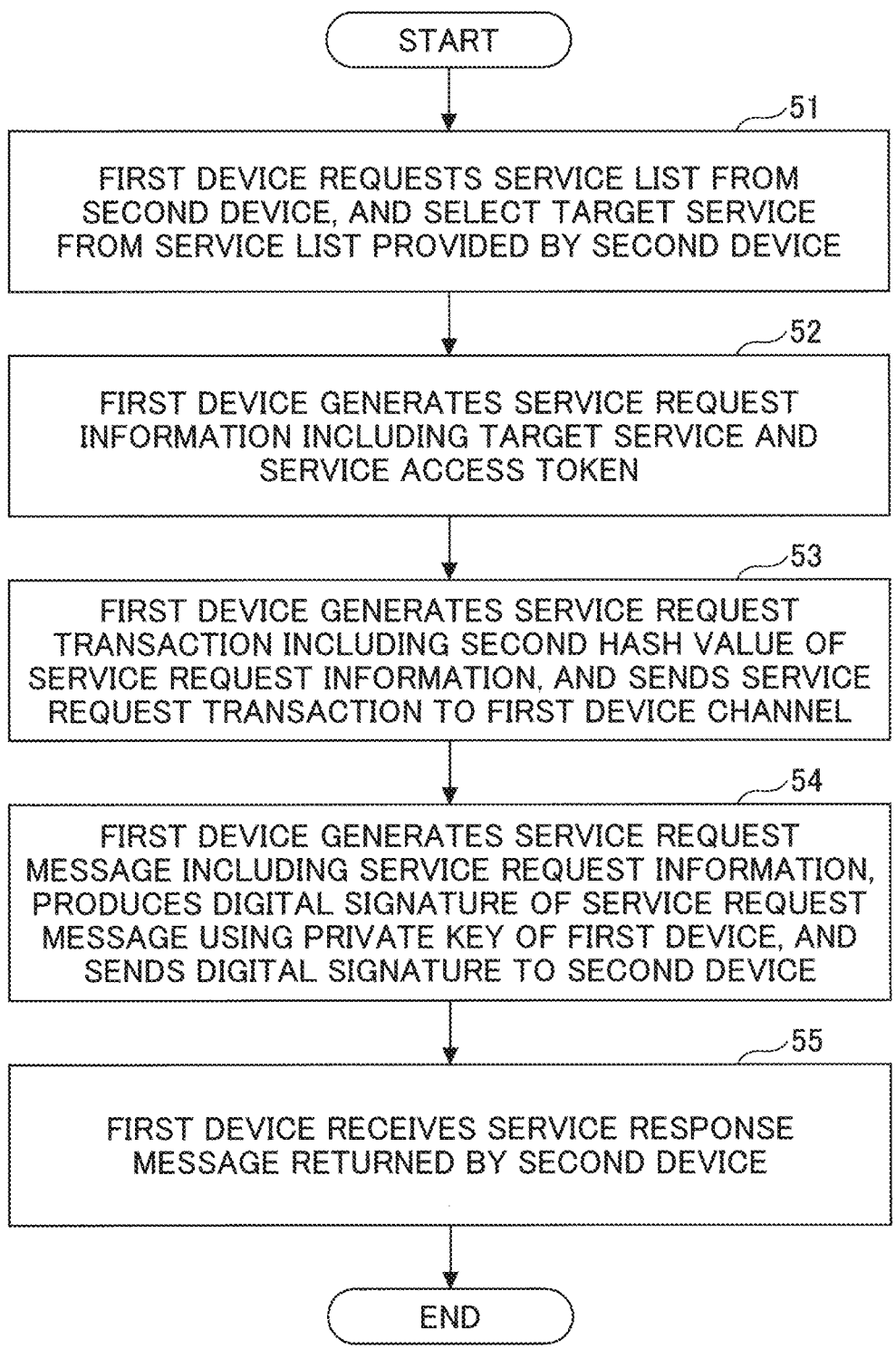
FIG. 5 is a schematic flowchart illustrating a service access control method according to an embodiment of the present invention.

As shown in FIG. 5, when applied to a first device side, the service access control method according to an embodiment of the present invention includes the following steps.

In step 51, the first device requests a service list from the second device, and selects a target service from the service list provided by the second device.

Here, after receiving the service list returned by the second device, the first device may select a desired target service from the service list.

In step 52, the first device generates service request information including the target service and a service access token.

Here, the service access token may be a payment transaction from the first device to the second device, which is recorded and confirmed by the distributed ledger, or a digital payment receipt other than the distributed ledger. The embodiment of the present invention is not limited to this.

In step 53, the first device generates a service request transaction, and sends the service request transaction to a first device channel. The service request transaction includes a second hash value of the service request information. The first device channel is established on the distributed ledger.

Here, the service request transaction may further include a second timestamp indicating when the service request transaction is generated, such that second device tests the service request.

In step 54, the first device generates a service request message including the service request information, produces a digital signature of the service request message using a private key of the first device, and sends the digital signature to the second device.

In step 55, the first device receives a service response message returned by the second device. The service response message indicates whether a service request is accepted.

Here, the first device receives a service response message. Then, the first device may start accessing the target service provided by the second device, if the service response message indicates that a service request is accepted.

Figure 6:
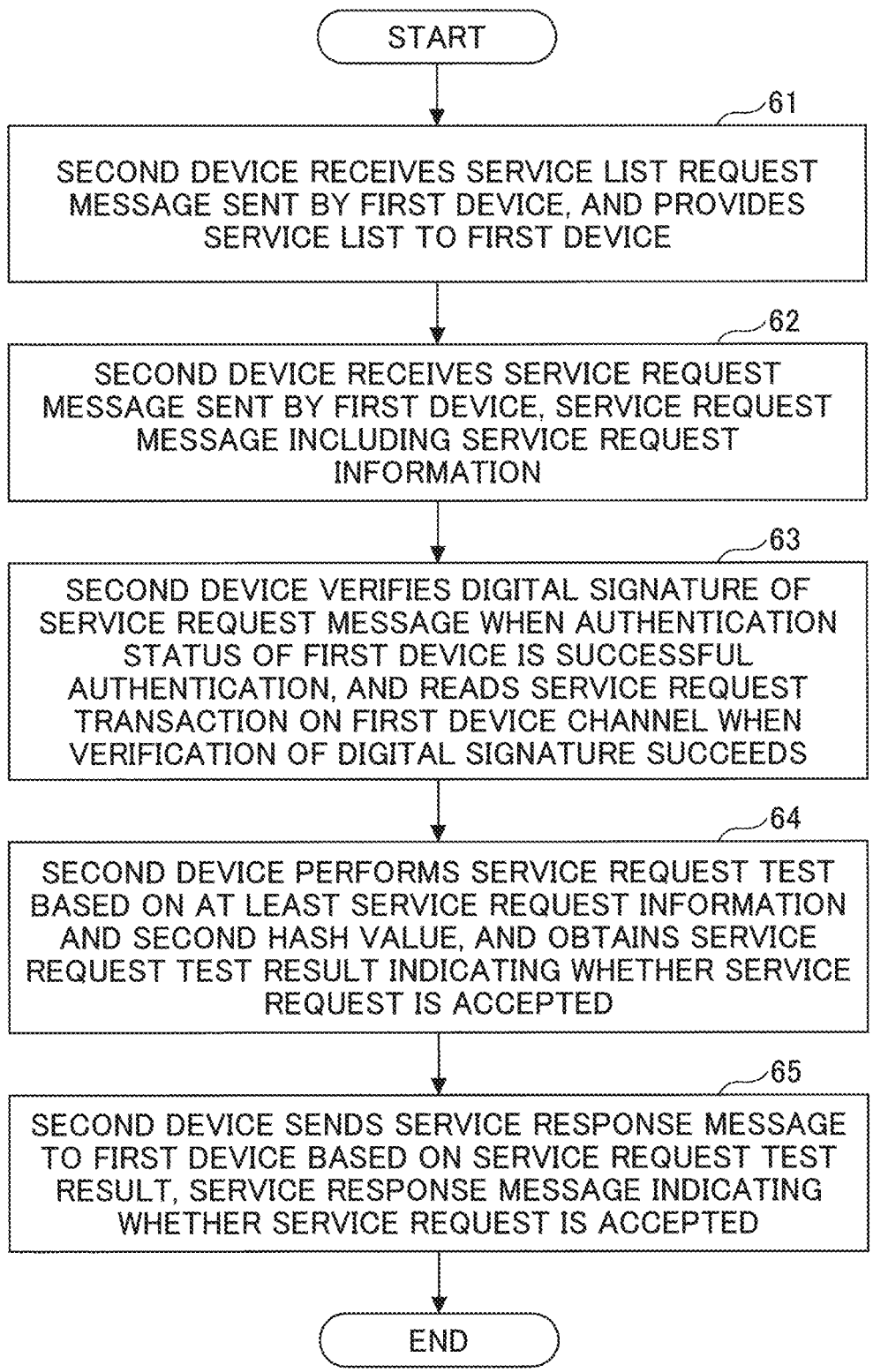
FIG. 6 is another schematic flowchart illustrating the service access control method according to the embodiment of the present invention.

As shown in FIG. 6, when applied to a second device side, the service access control method according to an embodiment of the present invention includes the following steps.

In step 61, the second device receives a service list request message sent by the first device, and provides a service list to the first device.

In step 62, the second device receives a service request message sent by the first device. The service request message includes service request information, and the service request information includes a target service and a service access token.

In step 63, the second device verifies a digital signature of the service request message using a public key of the first device when an authentication status of the first device indicates successful authentication, and reads a service request transaction on a first device channel based on pre-obtained device channel information of the first device channel when verification of the digital signature succeeds. The service request transaction includes at least a second hash value of the service request information, and the first device channel is established on a distributed ledger.

Here, the device channel information of the first device channel may be obtained in the process shown in FIG. 2 and stored locally in the second device, or may be provided to the second device by another method, such as a method of being pre-configured in the second device side. The embodiment of the present invention is not limited this.

In step 64, the second device performs a service request test based on at least the service request information and the second hash value, and obtains a service request test result indicating whether the service request is accepted.

In above step 64, the service request test may include the following test items, and obtain a service test result indicating that the service request is accepted only when all the test items succeeds.

(1) A fourth hash value of the service request information included in the service request message is calculated, and a test result indicating whether a hash value test succeeds is obtained, based on whether the fourth hash value is consistent with the second hash value.

(2) A test result indicating whether a token test succeeds is obtained, based on whether the service access token is a valid token.

In step 65, the second device sends a service response message to the first device based on the service request test result. The service response message indicates whether the service request is accepted.

By the above steps, the embodiment of the present invention can implement the service access control process, and a third-party authentication center is not required to perform real-name verification on an authentication request device in the above process, thereby reducing the deployment overhead of an authentication system, while also improving the efficiency of access service control. In addition, in the embodiments of the present invention, anonymous authentication is supported, thereby improving privacy of access service control.

As an example, the service request transaction may further include a second timestamp indicating when the service request transaction is generated. The test items further includes the following item.

(3) A second interval between a timestamp of receiving the service request message and the second timestamp is calculated, and a test result indicating whether a timeout test succeeds is obtained, based on whether the second interval is less than a predetermined second threshold.

If the test of all of the test items succeeds, the service test result indicating that the service request is accepted is obtained. If the test of any one of the test items fails, the test ends, no other test items are performed, and the service test result indicating that the service request is not accepted is obtained.

Note that during the test process of the above test items, the test may be performed in a predetermined order, and the embodiment of the present invention is not limited to a specific example.

As an example, when the service request test result indicating that the service request is accepted is obtained, the second device may further add the first device to a service access member list of the second device. Then, the second device may generate a service access member list update transaction including the first device and the target service. Then, the second device may encrypt the service access member list update transaction using an encryption key (a symmetric key), and send the service access member list update transaction encrypted by the encryption key to a service channel of the second device. Then, the second device may share the encryption key with a cooperative device of the second device. Here, the service channel is established on a distributed ledger, and provides the service access member list to the cooperative device of the second device, so that the cooperative device provides one or more services to one or more members in the service access member list.

In this example, the transactions on the service channel may be encrypted using a symmetric key. If the establishment device of the service channel (such as the first device) cooperates with another device (hereinafter referred to as a cooperative device) to provide services, the establishment device may send the symmetric key to the cooperative device to share the service access member list. The cooperative device may read the service access member list on the establishment device using the symmetric key, and provide services to a member device included in the service access member list, after completing mutual authentication with the member device.

Figure 7:
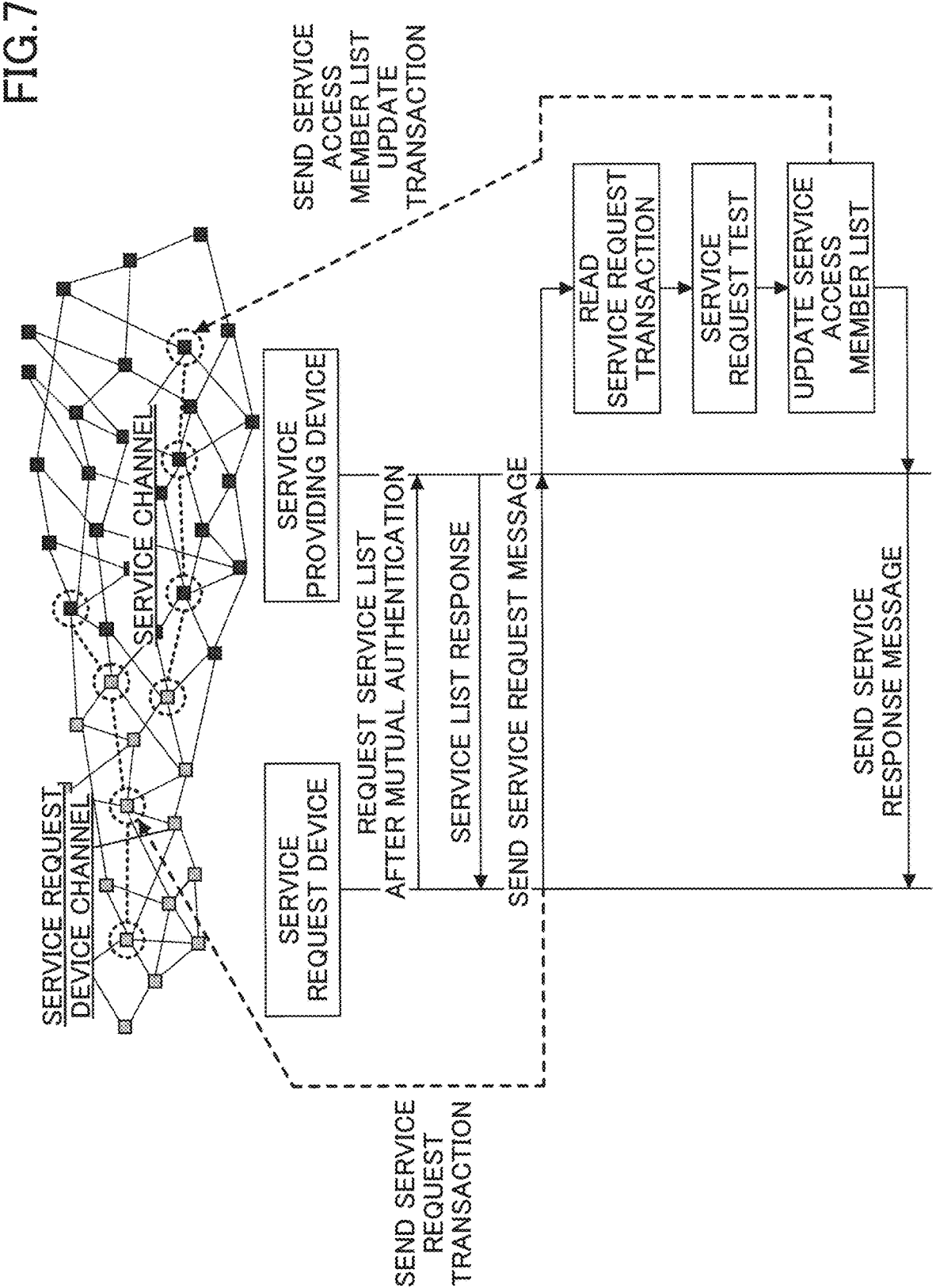
FIG. 7 is a schematic view illustrating an example of an interactive process of the service access control method according to the embodiment of the present invention.

FIG. 7 shows an example of an interactive process of the service access control method according to the embodiment of the present invention, which is applied between a service request device and a service providing device. The service request device in FIG. 7 may be one of the first device and the second device, and the service providing device may be the other device of the first device and the second device.

As shown in FIG. 7, the service request device sends a service list request message to the service providing device to obtain a service list, selects a desired target service, sends a service request transaction to a service request device channel, and sends a service request message to the service providing device. The service providing device receives the service request message, reads the service request transaction on the service request device channel of the service request device, and performs a service request test. If the test succeeds, the service providing device adds the service request device to the service access member list to update the service access member list, generates a service access member list update transaction, encrypts the service access member list update transaction using an encryption key and sends it to a service channel, and shares the encryption key with a cooperative device that collectively provides services to the service request device. In addition, the service providing device also sends a service response message including a service test result to the service request device.

As an example, in the process shown in FIG. 7, each device may establish a device channel of the device in a distributed ledger, and issue transactions on the device channel, so that the transactions can be read by other devices.

In order to facilitate the understanding of the above service access control process of the embodiment of the present invention, a detailed example will be described below.

In this example, the service providing device establishes a service channel other than the distributed ledger. In a blockchain or an IOTA protocol, the service channel establishing method is the same as the above device channel establishing method. The service providing device may symmetrically encrypt the transaction sent to the service channel using a service channel key. The transaction sent to the service channel includes a service access member list update transaction, and the service access member list includes user equipment that can legally access the service within a specified time period. The service providing device may share the encryption key of the service channel with other service providing devices. Other service providing devices may read the service access member list using the service channel key, and cooperate with the device that establishes the service channel to provide services to user equipments in the service access member list.

After the service request device and the service providing device have completed mutual authentication, the service request device may obtain a service list provided by the service providing device, select a desired service, and generate a service request message including service request information. The service request information specifically includes a desired service and a service access token. The service request device generates a service request transaction including a timestamp and a hash value of the service request information, and sends the service request transaction to the device channel of the service request device. Then, the service request device produces a digital signature of the service request message using a private key, and sends the service request message to the service providing device.

Here, the service access token may be a payment transaction from the service request device to the service providing device on the distributed ledger, such as a bitcoin payment transaction on a blockchain, or a MIOTA payment transaction on an IOTA. The service access token may also be a receipt or a pay order of another digital payment channel.

After receiving the service request message, the service providing device first checks whether a source device of the service request message has been authenticated. If the source device has been not authenticated, the service request message is discarded (dropped); and if the source device has been authenticated, the digital signature of the service request message is verified using the stored public key of the source device, and a service request test is further performed if the digital signature is valid. The service providing device queries the device channel of the service request device, reads the service request transaction, and executes the following test items.

(A) A time interval between the local time and a timestamp included in the service request transaction is calculated. If the time interval is greater than a specified timeout threshold, the test result of the test item is a timeout, and the service request fails. Otherwise, the test continues to the next test item.

(B) A hash value of the service request information included in the service request message is calculated. If the hash value and a hash value of the service request information included in the service request transaction are inconsistent, the test result of the test item is a hash value error, and the service request fails. Otherwise, the test continues to the next test item.

(C) The validity of the service request token is verified. If the service request token is invalid, the service test result is an invalid token. Otherwise, the service request is accepted. At this time, the service request device is added to the service access member list, and the service access member list update transaction is generated. The transaction includes device information of the service request device. Then, the service access member list update transaction is encrypted using an encryption key, and the service access member list update transaction is sent to the service channel to update the service access member list. Furthermore, the encryption key may be shared with other cooperative devices that collectively provide services to the service request device.

After the service test is completed, the service providing device sends a service response message to the service request device. The service response message includes the test result of the service request.

An embodiment of the present invention further provides devices corresponding to the above methods.

Figure 8:
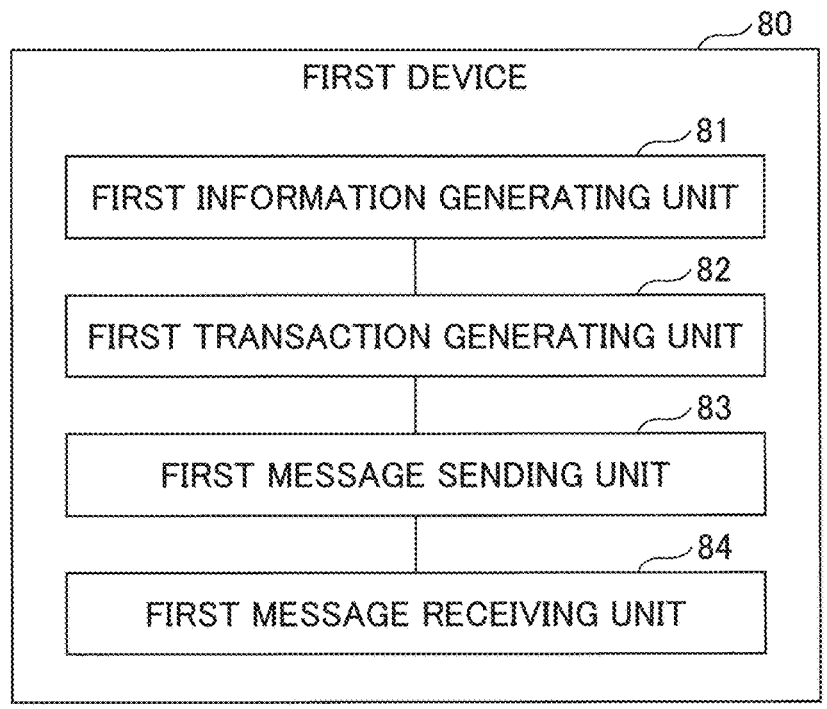
FIG. 8 is a schematic block diagram illustrating a configuration of a first device according to an embodiment of the present invention.

As shown in FIG. 8, the first device 80 according to an embodiment of the present invention includes a first information generating unit 81, a first transaction generating unit 82, a first message sending unit 83, and a first message receiving unit 84.

The first information generating unit 81 generates authentication request information.

The first transaction generating unit 82 generates an authentication request transaction, and sends the authentication request transaction to a first device channel. The authentication request transaction includes a public key of the first device and a first hash value of the authentication request information, and the first device channel is established on a distributed ledger.

The first message sending unit 83 generates an authentication request message including the authentication request information and device channel information of the first device channel, produces a digital signature of the authentication request message using a private key of the first device, and sends the digital signature to a second device.

The first message receiving unit 84 receives the authentication response message returned by the second device. The authentication response message indicates whether authentication of the first device succeeds.

Preferably, the authentication request transaction further includes a first timestamp indicating when the authentication request transaction is generated. The authentication request information includes a random number and device identification information of the first device. The device identification information includes at least one of a device ID, a MAC address, an IP address, a device brand, and a device type.

Preferably, the device channel information includes a blockchain account address of the first device, and a hash value of a last transaction on the first device channel, when the distributed ledger is a blockchain. Alternatively, the device channel information includes an ID of a MAM (Masked Authenticated Message) channel, and an address of a first transaction on the MAM channel, when the distributed ledger is an IOTA.

Preferably, the first device 80 further includes a key updating unit and a third transaction generating unit (not shown in FIG. 8).

The key updating unit updates the public key and the private key of the first device.

The third transaction generating unit generates a key revocation transaction including the updated public key, sends the key revocation transaction to the first device channel, and updates the public key of the first device.

Figure 9:
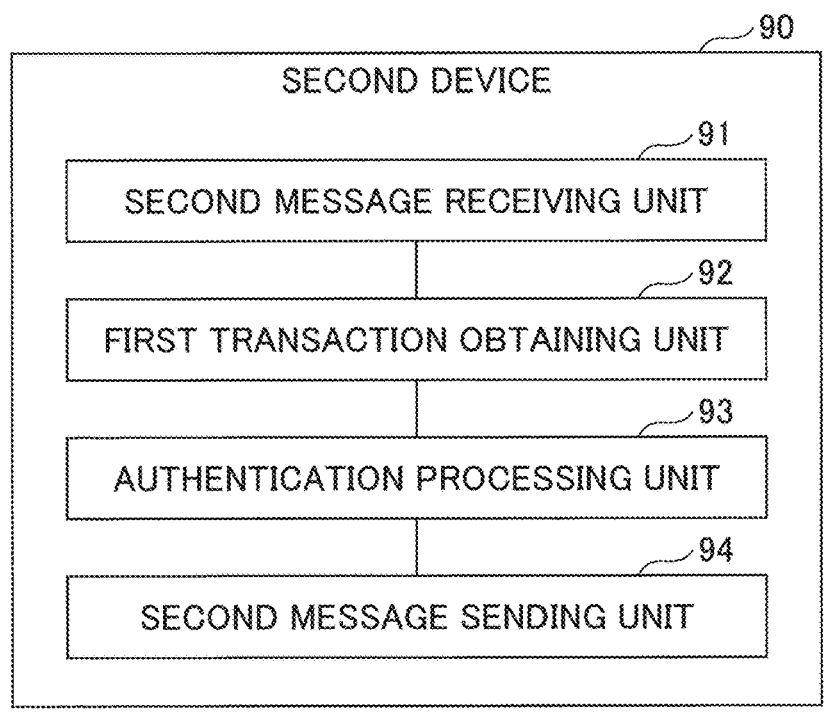
FIG. 9 is a schematic block diagram illustrating a configuration of a second device according to an embodiment of the present invention.

As shown in FIG. 9, the second device 90 according to an embodiment of the present invention includes a second message receiving unit 91, a first transaction obtaining unit 92, an authentication processing unit 93, and a second message sending unit 94.

The second message receiving unit 91 receives an authentication request message sent by a first device. The authentication request message including authentication request information and device channel information of a first device channel, and the first device channel is established on a distributed ledger.

The first transaction obtaining unit 92 reads an authentication request transaction on the first device channel based on the device channel information of the first device channel. The authentication request transaction includes a public key of the first device and a first hash value of the authentication request information.

The authentication processing unit 93 verifies a digital signature of the authentication request message using the public key of the first device, and performs an authentication test on the first device based on at least the first hash value and obtaining an authentication result when verification of the digital signature succeeds.

The second message sending unit 94 records an authentication status of the first device based on the authentication result, and sends an authentication response message to the first device. The authentication response message indicates whether authentication succeeds.

Preferably, the authentication processing unit 93 calculates a third hash value of the authentication request information included in the authentication request message, and obtains an authentication result indicating whether a hash value authentication succeeds, based on whether the third hash value is consistent with the first hash value. Then, the authentication processing unit 93 obtains the authentication result indicating that the authentication of the first device succeeds, when the hash value authentication succeeds.

Preferably, the authentication request transaction further includes a first timestamp indicating when the authentication request transaction is generated. The authentication request information includes a random number and device identification information of the first device.

The authentication processing unit 93 calculates a first interval between a timestamp of receiving the authentication request message and the first timestamp, and obtains a test result indicating whether timeout authentication succeeds, based on whether the first interval is less than a predetermined first threshold.

Alternatively, the authentication processing unit 93 obtains a test result indicating whether device validity authentication succeeds, based on whether the device identification information in the authentication request information matches a sending device of the authentication request message.

Alternatively, the authentication processing unit 93 queries historical transaction records on the first device channel, and obtains a test result indicating whether device reliability authentication succeeds, based on whether the number of the historical transaction records is greater than a predetermined number.

Figure 10:
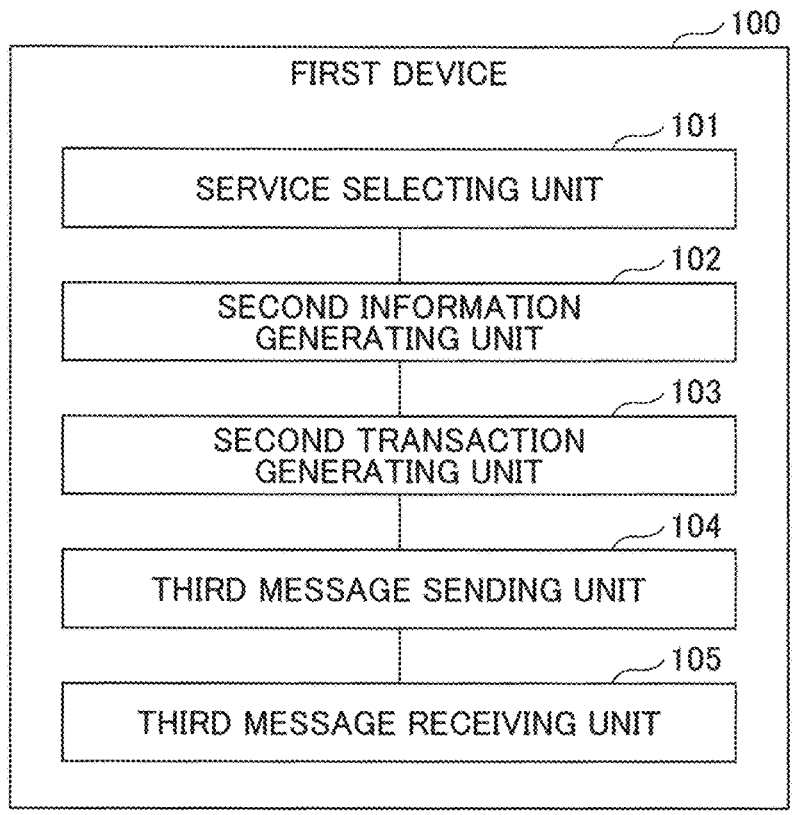
FIG. 10 is a schematic block diagram illustrating another configuration of a first device according to an embodiment of the present invention.

As shown in FIG. 10, the first device 100 according to another embodiment of the present invention includes a service selecting unit 101, a second information generating unit 102, a second transaction generating unit 103, a third message sending unit 104, and a third message receiving unit 105.

The service selecting unit 101 requests a service list from a second device, and selects a target service from the service list provided by the second device.

The second information generating unit 102 generates service request information including the target service and a service access token.

The second transaction generating unit 103 generates a service request transaction, and sends the service request transaction to a first device channel. The service request transaction includes a second hash value of the service request information, and the first device channel is established on a distributed ledger.

The third message sending unit 104 generates a service request message including the service request information, produces a digital signature of the service request message using a private key of the first device, and sends the digital signature to the second device.

The third message receiving unit 105 receives a service response message returned by the second device. The service response message indicates whether a service request is accepted.

Preferably, the service request transaction further includes a second timestamp indicating when the service request transaction is generated.

Figure 11:
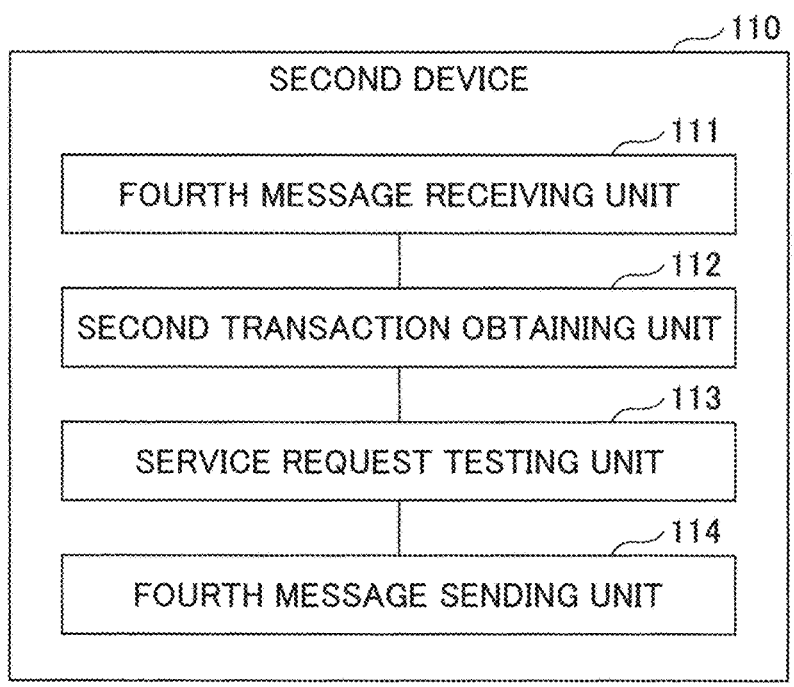
FIG. 11 is a schematic block diagram illustrating another configuration of a second device according to an embodiment of the present invention.

As shown in FIG. 11, the second device 110 according to another embodiment of the present invention includes a fourth message receiving unit 111, a second transaction obtaining unit 112, a service request testing unit 113, and a fourth message sending unit 114.

The fourth message receiving unit 111 receives a service list request message sent by a first device, provides a service list to the first device, and receives a service request message sent by the first device. The service request message includes service request information, and the service request information includes a target service and a service access token.

The second transaction obtaining unit 112 verifies the digital signature of the service request message using a public key of the first device if the authentication status of the first device indicates successful authentication, and reads a service request transaction on a first device channel based on pre-obtained device channel information of the first device channel when verification of the digital signature succeeds. The service request transaction includes at least a second hash value of the service request information, and the first device channel is established on a distributed ledger.

The service request testing unit 113 performs a service request test based on at least the service request information and the second hash value, and obtains a service request test result indicating whether a service request is accepted.

The fourth message sending unit 114 sends a service response message to the first device based on the service request test result. The service response message indicates whether the service request is accepted.

Preferably, the service request testing unit 113 calculates a fourth hash value of the service request information included in the service request message, and obtains a test result indicating whether a hash value test succeeds, based on whether the fourth hash value is consistent with the second hash value. Then, the service request testing unit 113 obtains a test result indicating whether a token test succeeds, based on whether the service access token is a valid token. Then, the service request testing unit 113 obtains the service request test result indicating that the service request is accepted, when the hash value test succeeds and the token test succeeds.

Preferably, the service request transaction further includes a second timestamp indicating when the service request transaction is generated. The service request testing unit 113 calculates a second interval between a timestamp of receiving the service request message and the second timestamp, and obtains a test result indicating whether a timeout test succeeds, based on whether the second interval is less than a predetermined second threshold.

Preferably, the second device 110 further includes a member list update unit and a member list update transaction generating unit (not shown in FIG. 11).

The member list update unit adds the first device to a service access member list of the second device, when the service request test result is that the service request is accepted.

The member list update transaction generating unit generates a service access member list update transaction including the first device and the target service. Then, the member list update transaction generating unit sends the service access member list update transaction encrypted by an encryption key to a service channel of the second device, and shares the encryption key with a cooperative device of the second device. The service channel is established on a distributed ledger, and provides the service access member list to the cooperative device of the second device, so that the cooperative device provides one or more services to one or more members in the service access member list.

Figure 12:
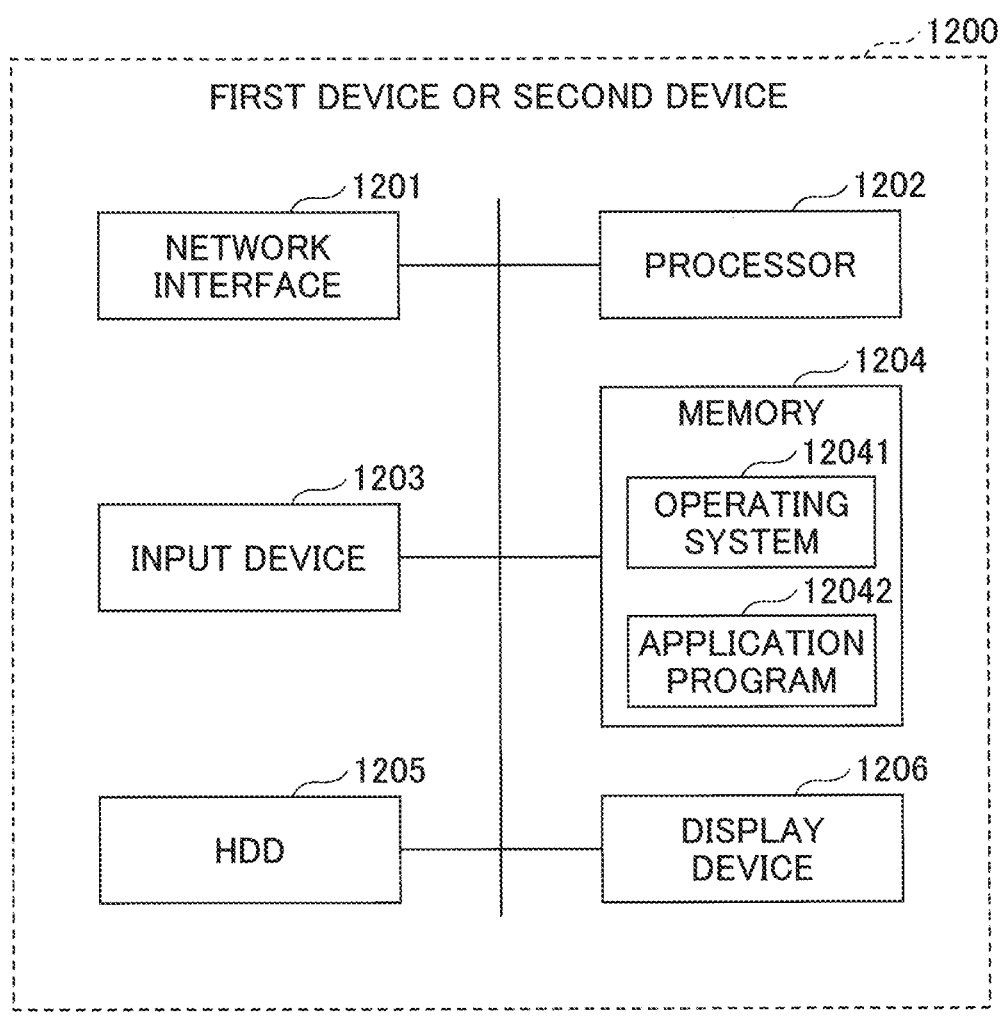
FIG. 12 is a schematic block diagram illustrating a hardware structure of a first device or a second device according to an embodiment of the present invention.

FIG. 12 is a schematic block diagram illustrating the hardware structure of a first device or a second device 1200 according to an embodiment of the present invention. As shown in FIG. 12, the first device or the second device 1200 includes a processor 1202, and a memory 1204 storing computer-readable instructions.

As illustrated in FIG. 12, the first device or the second device 1200 further includes a network interface 1201, an input device 1203, a hard disk drive (HDD) 1205, and a display device 1206.

Each of ports and each of devices may be connected to each other via a bus architecture. The processor 1202 such as one or more central processing units (CPUs), and the memory 1204 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. A detailed description of the bus architecture is omitted here.

The network interface 1201 may be connected to a network (such as the Internet, a LAN or the like), receive information from the network, and store the received information in the hard disk drive 1205.

The input device 1203 may receive various commands such as predetermined threshold and its setting information input by a user, and transmit the commands to the processor 1202 to be executed. The input device 1203 may include a keyboard, a pointing apparatus (such as a mouse or a track ball), a touch board, a touch panel or the like.

The display device 1206 may display a result obtained by executing the commands by the processor 1202. The memory 1204 stores programs and data required for running an operating system, and data such as intermediate results in calculation processes of the processor 1202.

Note that the memory 1204 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 1204 of the apparatus or the method described herein includes and is not limited to any other suitable memory.

In some embodiments, the memory 1204 stores executable modules or data structure, their subsets, or their superset, i.e., an operating system (OS) 12041 and an application program 12042.

The operating system 12041 includes various system programs for implementing various essential tasks and processing tasks based on hardware, such as a frame layer, a core library layer, a drive layer and the like. The application program 12042 includes various application programs for realizing various application tasks, such as a browser and the like. A program for realizing the method according to the embodiments of the present invention may be included in the application program 12042.

The method according to the above embodiments of the present invention may be applied to the processor 1202 or may be realized by the processor 1202. The processor 1202 may be an integrated circuit chip capable of processing signals. Each step of the above method may be realized by instructions in a form of integrated logic circuit of hardware in the processor 1202 or a form of software. The processor 1202 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any conventional processor. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 1204, and the processor 1202 reads information in the memory 1204 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

The device 1200 may be the first device in the process shown in FIG. 1. In this case, when the computer-readable instructions are executed by the processor 1202, the processor 1202 generates authentication request information; generates an authentication request transaction, and sends the authentication request transaction to a first device channel, the authentication request transaction including a public key of the first device and a first hash value of the authentication request information, and the first device channel being established on a distributed ledger; generates an authentication request message including the authentication request information and device channel information of the first device channel, produces a digital signature of the authentication request message using a private key of the first device, and sends the digital signature to a second device; and receives an authentication response message returned by the second device, the authentication response message indicating whether authentication of the first device succeeds.

Preferably, the authentication request transaction further includes a first timestamp indicating when the authentication request transaction is generated. The authentication request information includes a random number and device identification information of the first device. The device identification information includes at least one of a device ID, a MAC address, an IP address, a device brand, and a device type.

Preferably, the device channel information includes a blockchain account address of the first device, and a hash value of a last transaction on the first device channel, when the distributed ledger is a blockchain. Alternatively, the device channel information includes an ID of a MAM (Masked Authenticated Message) channel, and an address of a first transaction on the MAM channel, when the distributed ledger is an IOTA.

Preferably, when the computer-readable instructions are executed by the processor 1202, the processor 1202 further updates the public key and the private key of the first device; generates a key revocation transaction including the updated public key; and sends the key revocation transaction to the first device channel, and updates the public key of the first device.

The device 1200 may be the second device in the process shown in FIG. 2. In this case, when the computer-readable instructions are executed by the processor 1202, the processor 1202 receives an authentication request message sent by a first device, the authentication request message including authentication request information and device channel information of a first device channel, and the first device channel being established on a distributed ledger; reads an authentication request transaction on the first device channel based on the device channel information of the first device channel, the authentication request transaction including a public key of the first device and a first hash value of the authentication request information; verifies the digital signature of the authentication request message using the public key of the first device, and performs an authentication test on the first device based on at least the first hash value and obtaining an authentication result when verification of the digital signature succeeds; and records an authentication status of the first device based on the authentication result, and sends an authentication response message to the first device, the authentication response message indicating whether authentication succeeds.

Preferably, when the computer-readable instructions are executed by the processor 1202, the processor 1202 calculates a third hash value of the authentication request information included in the authentication request message, and obtains an authentication result indicating whether a hash value authentication succeeds, based on whether the third hash value is consistent with the first hash value; and obtains the authentication result indicating that the authentication of the first device succeeds, when the hash value authentication succeeds.

Preferably, the authentication request transaction further includes a first timestamp indicating when the authentication request transaction is generated. The authentication request information includes a random number and device identification information of the first device. When the computer-readable instructions are executed by the processor 1202, the processor 1202 calculates a first interval between a timestamp of receiving the authentication request message and the first timestamp, and obtains a test result indicating whether timeout authentication succeeds, based on whether the first interval is less than a predetermined first threshold; obtains a test result indicating whether device validity authentication succeeds, based on whether the device identification information in the authentication request information matches a sending device of the authentication request message; and queries historical transaction records on the first device channel, and obtains a test result indicating whether device reliability authentication succeeds, based on whether the number of the historical transaction records is greater than a predetermined number.

The device 1200 may be the first device in the process shown in FIG. 5. In this case, when the computer-readable instructions are executed by the processor 1202, the processor 1202 requests a service list from a second device, and selects a target service from the service list provided by the second device; generates service request information including the target service and a service access token; generates a service request transaction, and sends the service request transaction to a first device channel, the service request transaction including a second hash value of the service request information, and the first device channel being established on a distributed ledger; generates a service request message including the service request information, produces a digital signature of the service request message using a private key of the first device, and sends the digital signature to the second device; and receives a service response message returned by the second device, the service response message indicating whether a service request is accepted.

Preferably, the service request transaction further includes a second timestamp indicating when the service request transaction is generated.

The device 1200 may be the second device in the process shown in FIG. 6. In this case, when the computer-readable instructions are executed by the processor 1202, the processor 1202 receives a service list request message sent by a first device, and provides a service list to the first device; receives a service request message sent by the first device, the service request message including service request information, and the service request information including a target service and a service access token; verifies a digital signature of the service request message using a public key of the first device when an authentication status of the first device is successful authentication, and reads a service request transaction on a first device channel based on pre-obtained device channel information of the first device channel when verification of the digital signature succeeds, the service request transaction including at least a second hash value of the service request information, and the first device channel being established on a distributed ledger; performs a service request test based on at least the service request information and the second hash value, and obtains a service request test result indicating whether a service request is accepted; and sends a service response message to the first device based on the service request test result, the service response message indicating whether the service request is accepted.

Preferably, when the computer-readable instructions are executed by the processor 1202, the processor 1202 calculates a fourth hash value of the service request information included in the service request message, and obtains a test result indicating whether a hash value test succeeds, based on whether the fourth hash value is consistent with the second hash value; obtains a test result indicating whether a token test succeeds, based on whether the service access token is a valid token; and obtains the service request test result indicating that the service request is accepted, when the hash value test succeeds and the token test succeeds.

Preferably, the service request transaction further includes a second timestamp indicating when the service request transaction is generated. When the computer-readable instructions are executed by the processor 1202, the processor 1202 calculates a second interval between a timestamp of receiving the service request message and the second timestamp, and obtains a test result indicating whether a timeout test succeeds, based on whether the second interval is less than a predetermined second threshold.

Preferably, when the computer-readable instructions are executed by the processor 1202, the processor 1202 further adds the first device to a service access member list of the second device, when the service request test result indicating that the service request is accepted is obtained; generates a service access member list update transaction including the first device and the target service; and sends the service access member list update transaction encrypted by an encryption key to a service channel of the second device, and shares the encryption key with a cooperative device of the second device. The service channel is established on a distributed ledger, and provides the service access member list to the cooperative device of the second device, so that the cooperative device provides one or more services to one or more members in the service access member list.

As known by a person skilled in the art, the elements and algorithm steps of the embodiments disclosed herein may be implemented by electronic hardware or a combination of computer software and electronic hardware. Whether these functions are performed in hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may or may not be physically separated, and the components displayed as units may or may not be physical units, that is to say, may be located in one place, or may be distributed to network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically described embodiments, and various modifications, combinations and replacements may be made without departing from the scope of the present invention.

What is claimed is:

1. A device authentication method comprising:
generating, by a first device, authentication request information;
generating, by the first device, an authentication request transaction including a public key of the first device and a first hash value of the authentication request information;
sending the authentication request transaction to a first device channel, the first device channel being established on a distributed ledger;
generating, by the first device, an authentication request message including the authentication request information and device channel information, the device channel information identifying the first device channel on the distributed ledger;
producing a digital signature of the authentication request message using a private key of the first device;
sending the digital signature to a second device; and
receiving, by the first device, an authentication response message returned by the second device, the authentication response message indicating whether authentication of the first device succeeds.

2. The device authentication method as claimed in claim 1,
wherein the authentication request transaction further includes a first timestamp indicating when the authentication request transaction is generated,
wherein the authentication request information includes a random number and device identification information of the first device, and wherein the device identification information includes at least one of a device ID, a MAC address, an IP address, a device brand, or a device type.

3. The device authentication method as claimed in claim 1,
wherein the distributed ledger is a blockchain and the device channel information includes
a blockchain account address of the first device, and
a hash value of a last transaction on the first device channel, or
wherein the distributed ledger is an IOTA and the device channel information includes
an ID of a MAM (Masked Authenticated Message) channel, and
an address of a first transaction on the MAM channel.

4. The device authentication method as claimed in claim 1, further comprising:
updating, by the first device, the public key and the private key of the first device;
generating, by the first device, a key revocation transaction that includes the updated public key; and
sending, by the first device, the key revocation transaction to the first device channel, and updating the public key of the first device.

5. A device authentication method comprising:
receiving, by a second device, an authentication request message sent by a first device, the authentication request message including authentication request information and device channel information identifying a first device channel on a distributed ledger;
reading, by the second device, an authentication request transaction on the first device channel based on the device channel information of the first device channel on the distributed ledger, the authentication request transaction including a public key of the first device and a first hash value of the authentication request information;
verifying, by the second device, a digital signature of the authentication request message using the public key of the first device;
performing, by the second device, an authentication test on the first device based on at least the first hash value;
obtaining an authentication result in response to verification of the digital signature succeeding;
recording, by the second device, an authentication status of the first device based on the authentication result; and
sending an authentication response message to the first device, the authentication response message indicating whether authentication succeeds.

6. The device authentication method as claimed in claim 5,
wherein performing the authentication test on the first device based on at least the first hash value includes
calculating a third hash value of the authentication request information included in the authentication request message, and obtaining an authentication result indicating whether a hash value authentication succeeds, based on whether the third hash value is consistent with the first hash value, and
wherein obtaining the authentication result includes
obtaining the authentication result indicating that the authentication of the first device succeeds, when the hash value authentication succeeds.

7. The device authentication method as claimed in claim 6,
wherein the authentication request transaction further includes a first timestamp indicating when the authentication request transaction is generated, wherein the authentication request information includes a random number and device identification information of the first device, and wherein performing the authentication test on the first device and obtaining the authentication result further includes at least one of:

calculating a first interval between a timestamp of receiving the authentication request message and the first timestamp, and obtaining a test result indicating whether timeout authentication succeeds, based on whether the first interval is less than a predetermined first threshold;

obtaining a test result indicating whether device validity authentication succeeds, based on whether the device identification information in the authentication request information matches a sending device of the authentication request message; or querying historical transaction records on the first device channel, and obtaining a test result indicating whether device reliability authentication succeeds, based on whether the number of the historical transaction records is greater than a predetermined number.

8. A first device comprising:

at least one memory coupled to at least one processor, at least one processor configured to:

generate authentication request information;

generate an authentication request transaction;

send the authentication request transaction to a first device channel, the authentication request transaction including a public key of the first device and a first hash value of the authentication request information, and the first device channel being established on a distributed ledger;

generate an authentication request message including the authentication request information and device channel information identifying the first device channel on the distributed ledger;

produce a digital signature of the authentication request message using a private key of the first device;

send the digital signature to a second device; and receive an authentication response message returned by the second device, the authentication response message indicating whether authentication of the first device succeeds.

9. The first device as claimed in claim 8, wherein at least one processor is further configured to:

update the public key and the private key of the first device;

generate a key revocation transaction that includes the updated public key;

send the key revocation transaction to the first device channel; and update the public key of the first device.

10. The device authentication method as claimed in claim 1, wherein the first device is a node in the distributed ledger.

11. The device authentication method as claimed in claim 1, further comprising:

updating, by the first device, asymmetric keys of the first device;

generating, by the first device, a key revocation transaction including an updated public key; and sending, by the first device, the key revocation transaction to the first device channel.

12. The device authentication method as claimed in claim 5, wherein the first device is a node in the distributed ledger.

13. The first device as claimed in claim 8, wherein the first device is a node in the distributed ledger.

14. The first device as claimed in claim 8, wherein the at least one processor is configured to:

update asymmetric keys of the first device;

generate a key revocation transaction including an updated public key; and send the key revocation transaction to the first device channel.

* * * * *